United States Patent
Rolland-Thompson et al.

(10) Patent No.: US 11,169,024 B2
(45) Date of Patent: Nov. 9, 2021

(54) COMPACT FREEFORM ECHELLE SPECTROMETER

(71) Applicants: University of Rochester, Rochester, NY (US); PerkinElmer Health Sciences Canada, Inc., Woodbridge (CA)

(72) Inventors: Jannick Rolland-Thompson, Seneca Falls, NY (US); Aaron Bauer, Penfield, NY (US); Dennis Yates, Greensburg, PA (US); Mahsa Farsad, Sunnyvale, CA (US)

(73) Assignees: University of Rochester, Rochester, NY (US); PerkinElmer Health Sciences Canada, Inc., Woodbridge (CA)

( * ) Notice: Subject to any disclaimer, the term of this patent is extended or adjusted under 35 U.S.C. 154(b) by 0 days.

(21) Appl. No.: 16/639,475

(22) PCT Filed: Aug. 16, 2018

(86) PCT No.: PCT/IB2018/056187
§ 371 (c)(1),
(2) Date: Feb. 14, 2020

(87) PCT Pub. No.: WO2019/035047
PCT Pub. Date: Feb. 21, 2019

(65) Prior Publication Data
US 2021/0131869 A1 May 6, 2021

Related U.S. Application Data

(60) Provisional application No. 62/546,397, filed on Aug. 16, 2017.

(51) Int. Cl.
*G01J 3/18* (2006.01)
*G01J 3/02* (2006.01)
*G01J 3/28* (2006.01)

(52) U.S. Cl.
CPC ............. *G01J 3/1809* (2013.01); *G01J 3/021* (2013.01); *G01J 3/024* (2013.01); *G01J 3/0208* (2013.01); *G01J 3/2803* (2013.01)

(58) Field of Classification Search
CPC ........ G01J 3/1809; G01J 3/024; G01J 3/2803; G01J 3/0208; G01J 3/021
See application file for complete search history.

(56) References Cited

U.S. PATENT DOCUMENTS 5,402,227 A * 3/1995 Schuma ................. G01J 3/2823
356/328
5,784,158 A * 7/1998 Stanco ...................... G01J 3/02
356/326

(Continued)

*Primary Examiner* — Hina F Ayub
(74) *Attorney, Agent, or Firm* — Andrew J. Anderson, Esq.; Harter Secrest & Emery LLP (57) ABSTRACT

An echelle spectrometer includes a slit opening for incoming light, a collimator which collimates a diverging beam of light generated through the slit, a reflective echelle grating which disperses the collimated light along a first dimension; a cross-disperser which disperses at least a portion of the collimated light in a second dimension orthogonal to the first dimension to create a two-dimensional spectral field-of-view; and an imaging system which images the two-dimensional spectral field-of-view onto a detector; wherein the imaging system comprises primary, secondary, and tertiary tilted mirrors, where each of the tilted mirrors comprises a freeform, rotationally non-symmetric surface shape.

16 Claims, 7 Drawing Sheets

(56) References Cited

U.S. PATENT DOCUMENTS

| | | | |
|---|---|---|---|
| 10,809,124 B2* | 10/2020 | Farsad | G01J 3/0208 |
| 2005/0046839 A1* | 3/2005 | Harnisch | G01J 3/12 |
| | | | 356/328 |
| 2014/0268127 A1* | 9/2014 | Day | G01J 3/0208 |
| | | | 356/300 |
| 2016/0232258 A1* | 8/2016 | Yang | G02B 17/0642 |
| 2017/0268927 A1* | 9/2017 | Beardsley | G02B 5/005 |

* cited by examiner

COMPACT FREEFORM ECHELLE SPECTROMETER

TECHNICAL FIELD

Imaging spectrometers transform wavelength information from environmental or other external sources into relatively displaced images using optics such as reflective and diffractive optics that image an input aperture onto a detector over a range of positions displaced by the dispersion produced by the diffractive optics. The present disclosure in particular relates to the field of atomic spectroscopy and, more particularly, to an improved echelle spectrometer employing a freeform imaging system.

BACKGROUND OF THE INVENTION

In atomic spectroscopy, which includes atomic absorption, atomic emission, and atomic fluorescence, electromagnetic radiation of a wavelength characteristic of a particular element is quantitatively determined and used as a measure of the concentration of that particular element in a sample. The intensity of the radiation at the characteristic wavelength is proportional to the concentration of the element in the sample.

The sensitivity of any of these atomic spectroscopic techniques depends in part on the ability to select radiation of a particular wavelength range, resolve the selected wavelength range into a pattern of spectral lines, and detect the intensity of the radiation associated with the spectral lines. Wavelength selection and resolution are typically carried out by a spectrometer. Radiation of a range of wavelengths is passed through an entrance slit located at the focus of a collimator, such as an off-axis section of a parabolic mirror. The collimated rays are then reflected onto a grating and dispersed into a pattern of spectral lines (i.e., a dispersion pattern), with each wavelength being dispersed at a characteristic angle (i.e., a dispersion angle) from the grating.

In spectrometers using conventional high ruling density gratings, measurement of radiation is typically conducted for the lower diffraction orders, most preferably the first order. This is done because of the potential overlap of wavelengths of different orders emitted at the same angle from the grating and because a much higher percentage of radiation can be obtained using the first order in these conventional gratings. However, both the dispersion (i.e., angular dispersion) and resolving power of the grating are improved when higher orders are used.

To take advantage of the greater resolution and angular dispersion obtainable at higher orders, echelle gratings with blazed lines are employed. Echelle gratings are characterized by a smaller size with fewer ruled lines (e.g., typically less than or equal to about 200 lines/mm compared with much higher line density in a conventional grating, which are typically at least several hundred lines/mm). The lines are cut into the surface of the grating at an angle or blaze to the surface. The blaze changes the diffraction properties of the grating so that for any wavelength range it is possible to channel a higher proportion of radiation into the higher orders at the desired diffractive angle. The various diffraction orders generally lie on top of one another. A cross dispersion element, such as a prism or conventional grating, can be used to separate the overlapping orders into the orthogonal direction, creating a two-dimensional spectral field-of-view.

Once the echelle grating and cross-disperser resolve the radiation into different diffracted angles in a two-dimensional spectral field-of-view, a further imaging system is then used to image the dispersion pattern onto a detector focal plane. This pattern consists of images of the entrance slit for each wavelength being dispersed.

The two-dimensional format and high dispersion of echelle grating optical systems with cross-dispersion can be combined with area array detectors such as multichannel, solid-state detectors to meet the needs of atomic emission spectroscopy. These needs include high resolving power, high optical throughput, and desired spectral coverage. Various echelle spectrometers have been developed for inductively coupled plasma optical emission spectroscopy (ICP-OES) using either photomultiplier tubes (PMT) or multichannel solid-state detectors. The PMT-based systems typically employ spherical mirrors with focal lengths in the range of 500-750 mm which produce images suitable for use with exit slits or fiber optics (see, e.g., Elliott, W. G. *Am. Lab.* 1970, 2 (3), 67; and Zander, A. T.; Miller, M. H.; Hendrick, M. S.; Eastwood, D. *Appl. Spectrosc.* 1985, 39, 1.) Each PMT detects one wavelength at a time, and the adjacent background spectra are scanned sequentially. Since the exit apertures can be positioned independently, there is no fundamental requirement for a flat image plane. However, mechanical interferences among exit slits, fiber optic assemblies, and/or PMTs constrain the selection of emission lines. Spectral resolution is determined by the effects of focal lengths, slit apertures, optical aberrations, and manufacturing tolerances.

Echelle spectrometers with two-dimensional, multichannel solid-state detectors offer high flexibility in the choice of emission lines and can monitor spectral backgrounds simultaneously. However, their optical design must be compatible with the detector geometry while providing high resolving power, broad spectral coverage, and high optical throughput. Existing echelle spectrometers used with solid-state detectors typically sacrifice one or more of these performance aspects relative to PMT systems (see, e.g., Sims, G. R.; Denton, M. B. In *Multichannel Image Detectors*; Talmi, Y., Ed.; ACS Symposium Series 236; American Chemical Society: Washington, D.C., 1983; Vol. 2, Chapter 5). For example, reducing the output focal length to fit the spectrum onto the detector reduces reciprocal linear dispersion and increases spherical aberration, both of which degrade spectral resolution. Reducing the entrance aperture will improve resolution but at the expense of optical throughput. As an example of these tradeoffs, the system described by Bilhorn and Denton covered a simultaneous range from 225 to 515 nm and had a spectral slit width (the product of reciprocal linear dispersion and physical slitwidth) of 0.013 nm at 225 nm and a 50-fold luminosity reduction relative to the same optical system configured for PMT outputs (Bilhorn, R. B.; Denton, M. B. *Appl. Spectrosc.* 1989,43, 1). Scheeline et al. gave an extensive discussion of optical design considerations for an echelle spectrometer with a charge-coupled device (CCD) detector (Scheeline, A.; Bye, C. A.; Miller, D. L.; Rynders, S. W.; Owen, R. C., Jr. *Appl. Spectrosc.* 1991, 45, 334). Their system covered 210 nm of spectral range simultaneously and provided 0.02-0.05-nm resolution. Finally, the echelle-CID system reported by Pilon et al. covered the wavelength range from 185 to 512 nm simultaneously and demonstrated about 0.09 nm resolution at 249.7 nm (see, e.g., Pilon, M. J.; Denton, M. B.; Schleicher, R. G.; Moran, P. M.; Smith, S. B., Jr. *Appl. Spectrosc.* 1990, 44, 161).

Expanded performance opportunities for imaging spectrometers using φ-polynomial freeform surfaces in reflective and diffractive optics are described in WO 2016/200816.

The described imaging spectrometers are generally of a type that include an entrance aperture for admitting radiation over a range of wavelengths, a detector array, a primary reflective optic with optical power, a secondary reflective diffractive optic, and a tertiary reflective optic with optical power for collectively imaging the entrance aperture onto the detector array through a range of dispersed positions. One or more of the primary reflective optic, the secondary reflective diffractive optic, and the tertiary reflective optic can include a φ-polynomial optical surface with no axis of symmetry and represented by a function that depends on both a radial component and an azimuthal component.

The present disclosure describes a compact echelle grating optical system optimized for use with area array detectors, such as multichannel solid-state detectors, and more particularly such as CMOS based sensors and segmented-array CCD detectors ((SCD) described in Barnard et al. *Anal. Chem.* 1993, 65, 1231). The compact optical system is designed to image a high-resolution spectrum specifically for UV light from 160 to 400 nm onto the detector surface. Also, it is designed to provide high optical throughput, low stray light, and high stability. Performance below 300 nm is particularly important because of the high population density of useful ICP analytical lines in this region of the spectrum (see, e.g., Mermet, J.-M. *J. Anal. At. Spectrom.* 1987, 2, 68).

BRIEF SUMMARY OF THE INVENTION

The present disclosure describes an echelle spectrometer comprising:
a slit opening for incoming light,
a collimator which collimates a diverging beam of light generated through the slit,
a reflective echelle grating which disperses the collimated light along a first dimension;
a cross-disperser which disperses at least a portion of the collimated light in a second dimension orthogonal to the first dimension to create a two-dimensional spectral field-of-view; and
an imaging system which images the two-dimensional spectral field-of-view onto a detector;
wherein the imaging system comprises primary, secondary, and tertiary tilted mirrors, where each of the tilted mirrors comprises a freeform, rotationally non-symmetric surface shape.

DETAILED DESCRIPTION OF THE INVENTION

Figure 1A:
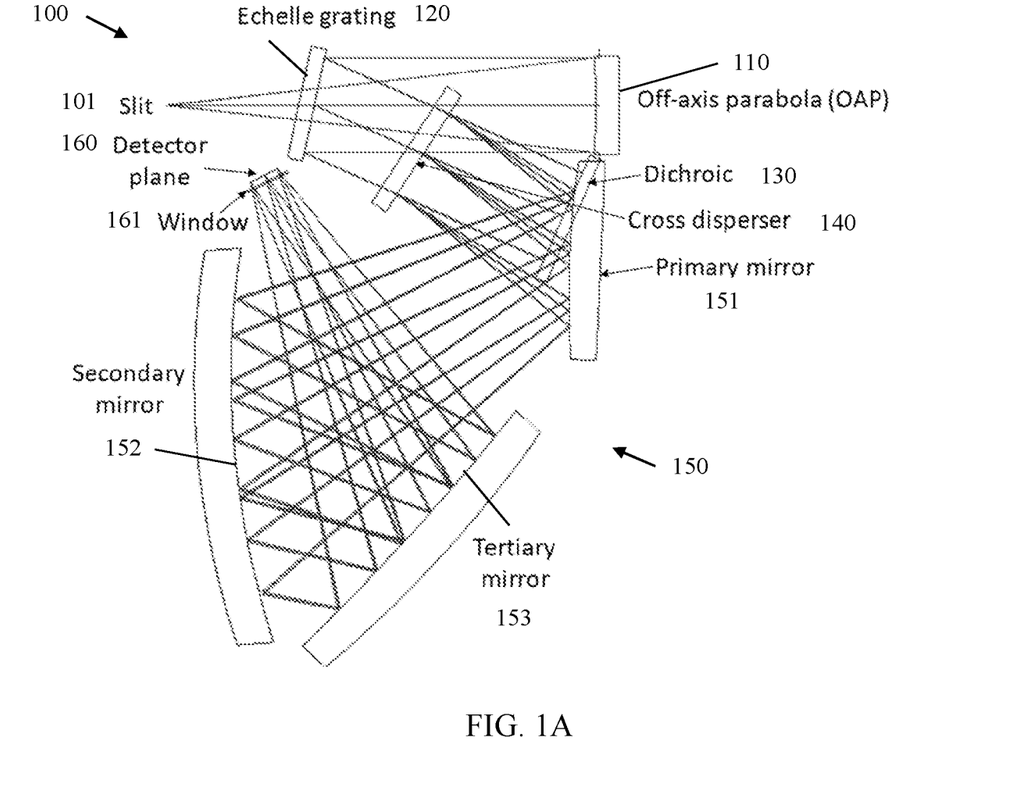
FIG. 1A is an illustration in 2D perspective of the main components of an echelle spectrometer in accordance with the present disclosure.
Figure 1B:
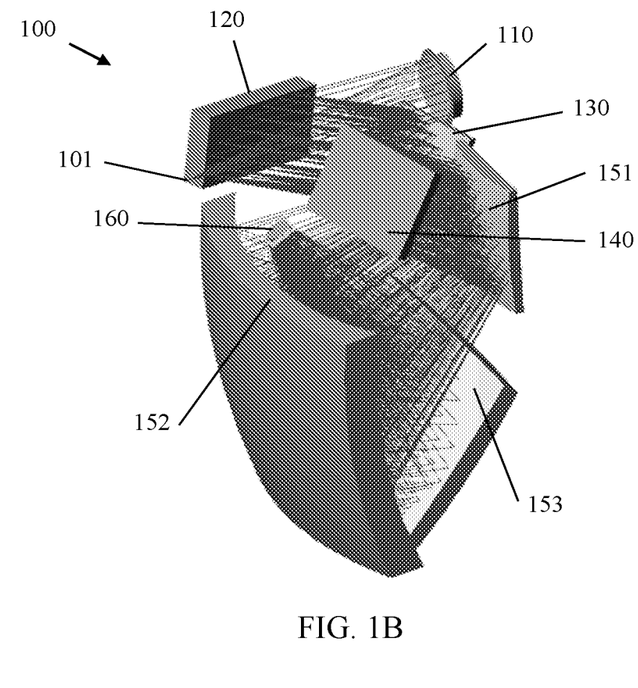
FIG. 1B is an illustration in 3D perspective of the main components of an echelle spectrometer in accordance with the present disclosure.

Referring to FIGS. 1A and 1B, a description of the operation of an echelle spectrometer optical system 100 in accordance with the present disclosure will now be given. Note that the illustrated system assembly uses tilts in all three dimensions, and though it may look like there are ray clearance issues in the 2D layout of FIG. 1A, this is merely a result of the perspective as seen from the 3D perspective of FIG. 1B.

The coordinate system convention that will be used and referenced in this disclosure is referred to as the Local Surface Coordinates. This is a coordinate system that exists for each surface independent of its location in the full system assembly and whose origin is located at the vertex of that surface. The local surface coordinates are used for the fabrication and characterization of each individual optical surface. From a viewing perspective looking at the face of the surface, the +z-axis always points into the surface and the +y-axis always points towards the top of the surface. When there is an offset aperture referenced for an optical surface, the local surface coordinate origin remains located at the vertex of the parent aperture, not the offset aperture.

In a separate optical system (e.g., a plasma image transfer station of an inductively coupled plasma optical emission spectroscopy (ICP-OES) system as described in Barnard et al. "Design and Evaluation of an Echelle Grating Optical System for ICP-OES", *Anal. Chem.* 1993, 65, 1225-1230), light is generated that illuminates the slit 101 in the echelle spectrometer in the present disclosure. In one embodiment, slit 101 may be, e.g., of the following dimensions: 5-15 μm in width and 100-250 μm in height (e.g., 10 μm in width and 150 μm in height, or 11 μm in width and 175 μm in height). Further, the slit may have, e.g., an in-plane slit tilt (e.g., 44.35 degrees) and an out-of-plane slit tilt (e.g., of 4.29 degrees). The diverging light emitted from this slit is incident upon a collimator 110, such as an off-axis section of a parabolic mirror, whose function is to collimate the beam. In one embodiment, e.g., the collimator 110 may be an off-axis parabola of from 150-250 mm focal length (e.g., 175 mm) and from 75-125 mm diameter aperture (e.g., 100 mm). The ratio of the collimator focal length to the aperture diameter further may be preferably less than about 2 (e.g., 1.5-2) to reduce the volume of the optical system 100.

After being collimated and reflected by the off-axis parabola, the collimated light is incident upon a reflective echelle grating 120, comprising echelle grating lines parallel to a plane including the optical system axis, so that the diffraction occurs in a direction perpendicular to the plane including the optical system axis. The echelle grating may be ruled, e.g., using an interferometrically controlled ruling engine, wherein the groove profile, blaze angle, and ruling density are controlled accurately across the entire grating to ensure high diffraction efficiency and low stray light. In the spectrometer, e.g., the echelle grating lines may be parallel to a horizontal plane including the optical system axis, so that diffraction occurs in the vertical direction.

Figure 2:
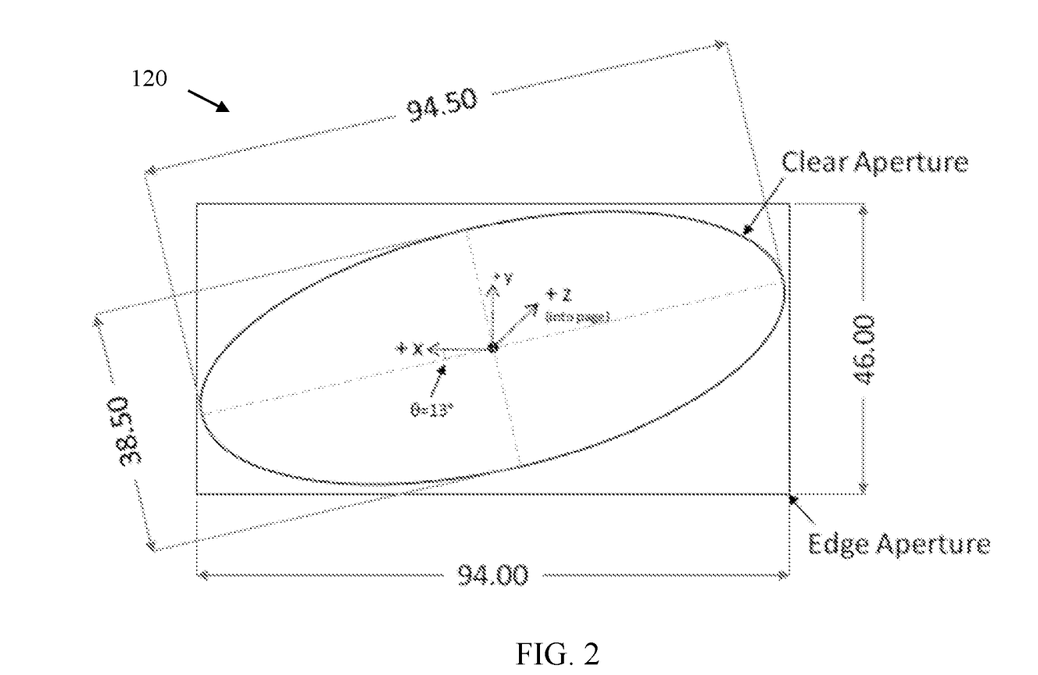
FIG. 2 is a perspective view looking at the reflective/diffractive surface of an echelle grating which may be employed in an embodiment of the disclosure.

The echelle grating is tilted near the blaze angle of the diffraction grating grooves (e.g., at an angle near 0.5 degrees from the blaze angle). Typical blaze angles may be, e.g., from about 50-80 degrees. This steep angle results in the light diffracting into much higher orders than typically used for diffraction gratings, which yields high spectral resolution. A blaze angle (66°) and ruling density (125 lines/mm) of the echelle grating, e.g., result in diffraction orders 36 to 89 covering the wavelength range from 160 to 400 nm. A grating which may be employed in the present disclosure, e.g., is Catalog Number 53-*-187E from Richardson Gratings, with a coating reflective from 160-400 nm. The used area within a rectangular aperture of the echelle grating 120 takes the shape of a rotated ellipse, as shown in the footprint plot in FIG. 2. The echelle grating may have, e.g., a rectangular edge aperture of 94×46 mm (X by Y), with a clear aperture major axis of 94.5 mm and minor axis of 38.5 mm, and an angle (θ) between the major axis and local X-axis of 13 degrees. The light remains collimated, but is dispersed along one dimension (e.g., X axis).

The light is then incident upon a planar dichroic mirror 130 that reflects the ultraviolet light (160-400 nm wavelength) and transmits the longer wavelength visible. The dichroic mirror 130 may have, e.g., a rectangular edge aperture of 58×54 mm (X by Y), with a clear aperture of 55.5 mm×52.3 mm. The remainder of the echelle spectrometer optical system 100 is designed for use in the ultraviolet portion of the spectrum.

Figure 3:
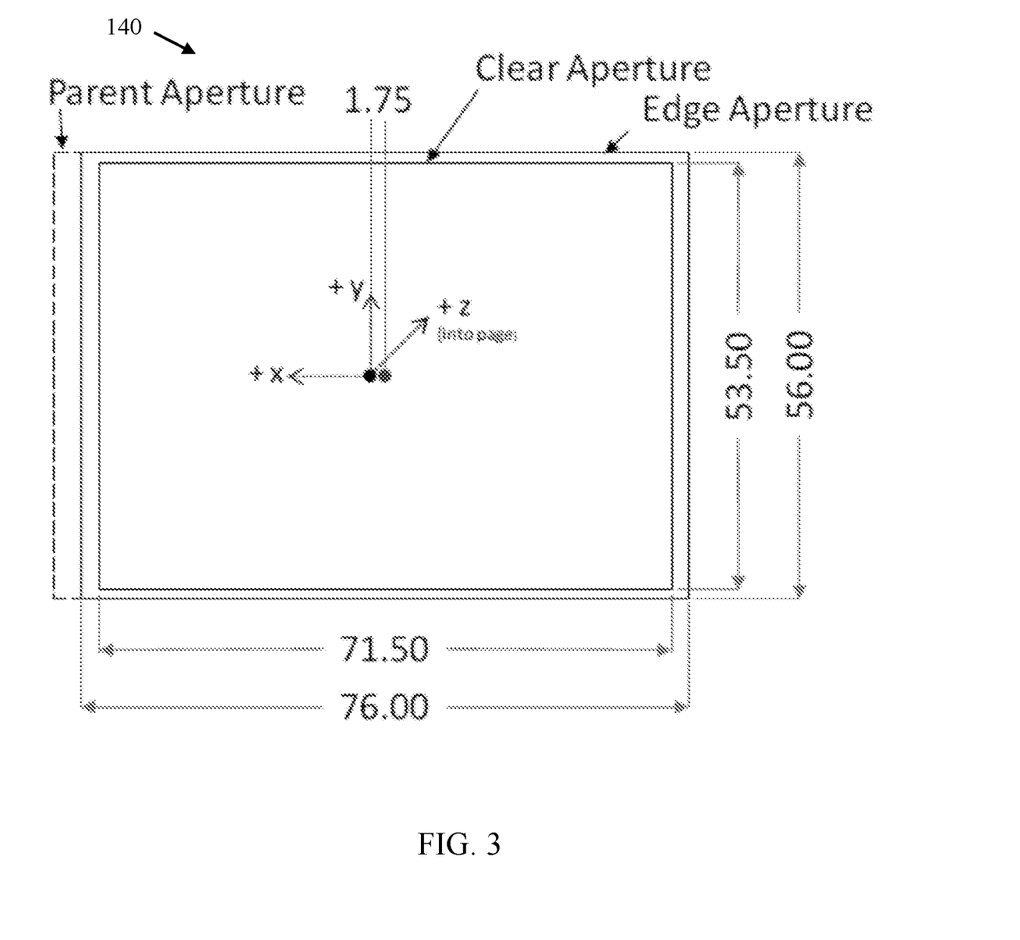
FIG. 3 is a perspective view looking at the reflective surface of a cross disperser which may be employed in an embodiment of the disclosure.

The still collimated reflected ultraviolet light is then incident on a reflective cross-disperser 140, which is a standard planar diffraction grating, that disperses the light in the dimension orthogonal (e.g., Y axis) to the dispersion direction of the echelle grating. The grating efficiency should be maximized in the −1 order and minimized in the −2 order, where the −1 order is defined as the diffraction order of unit magnitude that diffracts the light at a shallower angle (more towards the normal) than the $0^{th}$ order reflection. In a particular embodiment, the cross-disperser may have, e.g., near 500 grooves/mm and is tilted in both X and Y axis to unobscure the outgoing diffracted light. The cross disperser 140 may have, e.g., a rectangular edge aperture of 76×56 mm (X by Y), with a clear aperture of 71.5 mm×53.5 mm, and an aperture offset of 1.75 mm as shown in FIG. 3. This diffraction pattern creates a two-dimensional spectral field-of-view of collimated light.

The next three mirrors 151, 152, 153 constitute primary, secondary, and tertiary tilted mirrors of a freeform imager 150 whose function is to image the collimated two-dimensional spectral field-of-view onto a detector 160 to measure the intensity of the dispersed spectra. To substantially decrease the volume of the overall system, the optical surfaces within the freeform imager have been tilted, which introduces optical aberrations into the system, resulting in poor imaging quality. The image quality is recovered by using rotationally non-symmetric surface shapes, known as freeform shapes, for each of the three mirrors. The primary, secondary, and tertiary mirrors are described, without lack of generality, by Zernike polynomials and allow the dispersed light to be imaged with high resolution onto the detector plane.

In a particular embodiment, primary, secondary, and tertiary tilted mirrors 151, 152, 153 are optically coupled in a folded configuration fitting within a linear envelope having a maximum diameter that is less than six times a maximum entrance pupil diameter of the imaging system.

The primary, secondary, and tertiary mirrors more particularly may be freeform surfaces described by a base conic with a Zernike polynomial cap, following the equation:

$$z(x, y) = \frac{c\rho^2}{1 + \sqrt{1 - (1+\kappa)c^2\rho^2}} + \sum_{j=1}^{36} C_j Z_j,$$

where z is the sag of the surface, c is the curvature of the base conic, ρ is the radial coordinate where $\rho = \sqrt{x^2+y^2}$, κ is the conic constant, $C_j$ is the coefficient of the $j^{th}$ Zernike term, $Z_j$. The aberrations generated by tilting the primary, secondary, and tertiary mirror are corrected by the freeform terms on the three mirrors. The ultraviolet light from 160-400 nm exiting the cross disperser is imaged onto the detector by this optical system.

Further details with regard to the design of rotationally non-symmetric freeform surface shapes for each of the three mirrors employed in the present described system may be found, e.g., in U.S. Pat. No. 8,616,712. As described therein, the influence of a φ-polynomial surface in an optical system is highly dependent on its position relative to the (aperture) stop surface. In any optical system, there are apertures that limit the light that can pass through the optical system. The aperture that determines the cone of light that can be accepted by the optical system, thereby defining the limiting f/number, is the aperture stop. At this surface all field points will fill the entire aperture in a system without vignetting, which we assume here. This property combined with the constraint of a rotationally symmetric surface meant that in prior designs only spherical aberration is present on-axis and its contribution throughout the field is constant. When φ-polynomial surfaces are placed at or near the stop surface, their contribution to the aberration function will also be field-constant. The optical designer now has the ability to introduce conventional field dependent aberrations on-axis and to remove on-axis aberrations (e.g. coma) introduced by a tilted surface. For surfaces located away from the stop, the active area of the surface will be different for each field point, shrinking relative to the clear aperture and moving off center. For a φ-polynomial surface away from the stop, a mix of aberrations of lower radial order than the surface itself will contribute to the wavefront for each off-axis field point in addition to a field-constant aberration contribution of the same radial order as the surface itself.

Primary mirror 151 may be convex to expand the incident two-dimensional spectral field-of-view, while both secondary mirror 152 and tertiary mirror 153 may be concave to minimize the package size. The use of a convex primary mirror 151 is common in imagers designed for large fields-of-view. The starting design consists of all-spherical mirrors folded into a final, unobscured geometry. While the mirror tilts are optimized to minimize aberrations while still maintaining an unobscured geometry using ray clearance constraints, the initial relatively small coma and astigmatism contributions of an on-axis starting point are increased by an order of magnitude as a result of tilting the mirrors. The freeform surfaces were then designed in accordance with the above equation for each mirror surface to provide a required amount of correction.

Figure 4:
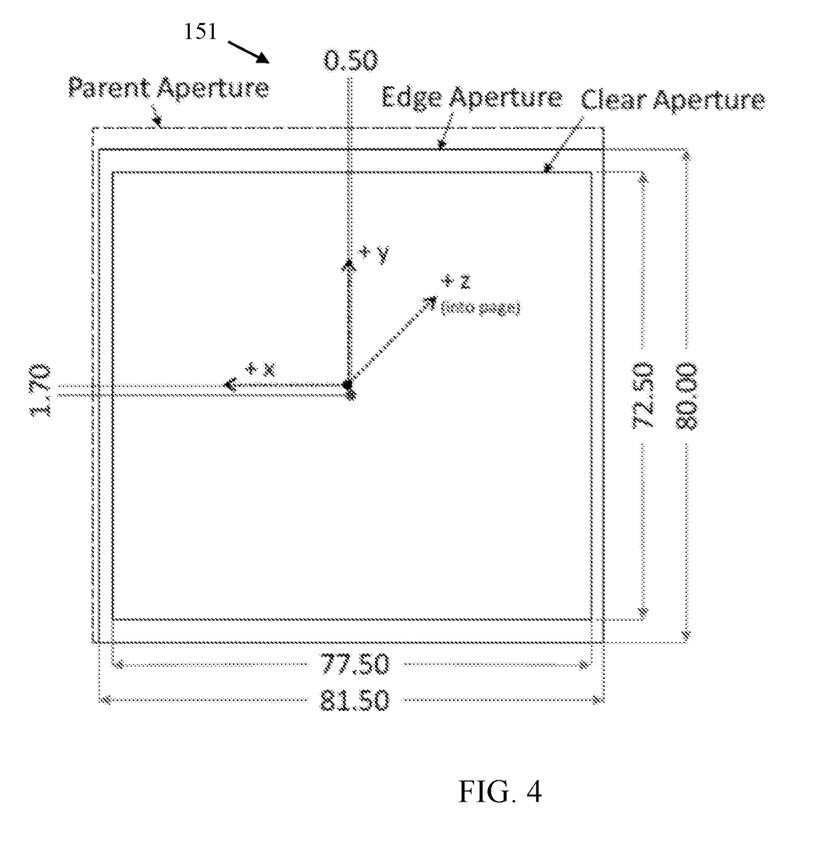
FIG. 4 is a perspective view looking at the reflective freeform surface of a primary mirror which may be employed in an embodiment of the disclosure.

As shown in FIG. 4, the primary mirror 151 may have, e.g., a rectangular edge aperture of 81.5×80 mm (X by Y), with a clear aperture of 77.5 mm×72.5 mm, and an aperture offset of 0.5 mm in the X axis and 1.7 mm in the Y axis.

Figure 5:
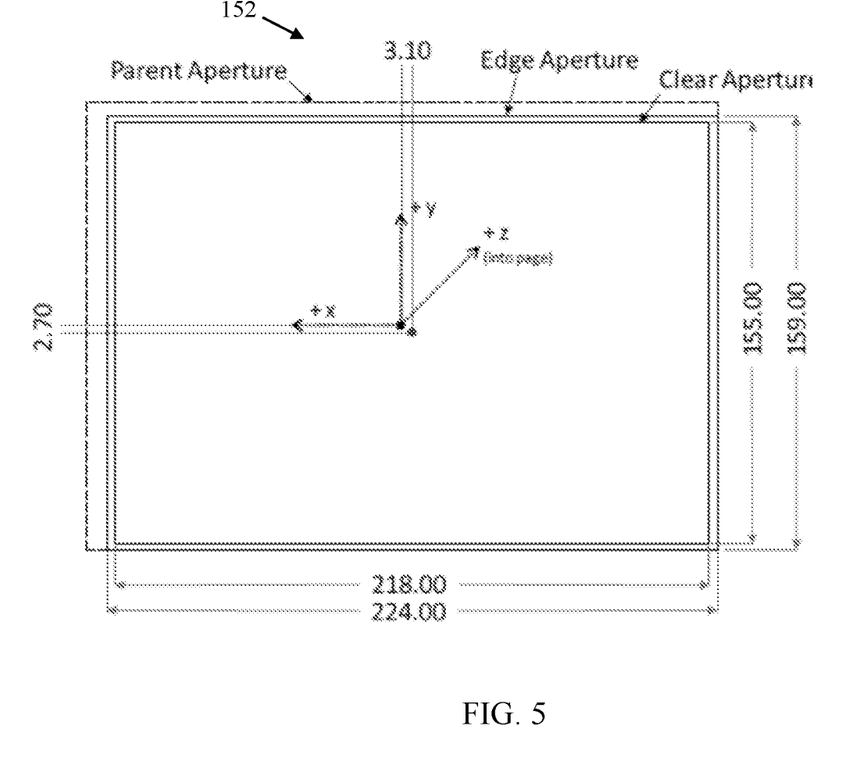
FIG. 5 is a perspective view looking at the reflective freeform surface of a secondary mirror which may be employed in an embodiment of the disclosure.

As shown in FIG. 5, the secondary mirror 152 may have, e.g., a rectangular edge aperture of 224×159 mm (X by Y), with a clear aperture of 218 mm×155 mm, and an aperture offset of 3.1 mm in the X axis and 2.7 mm in the Y axis.

Figure 6:
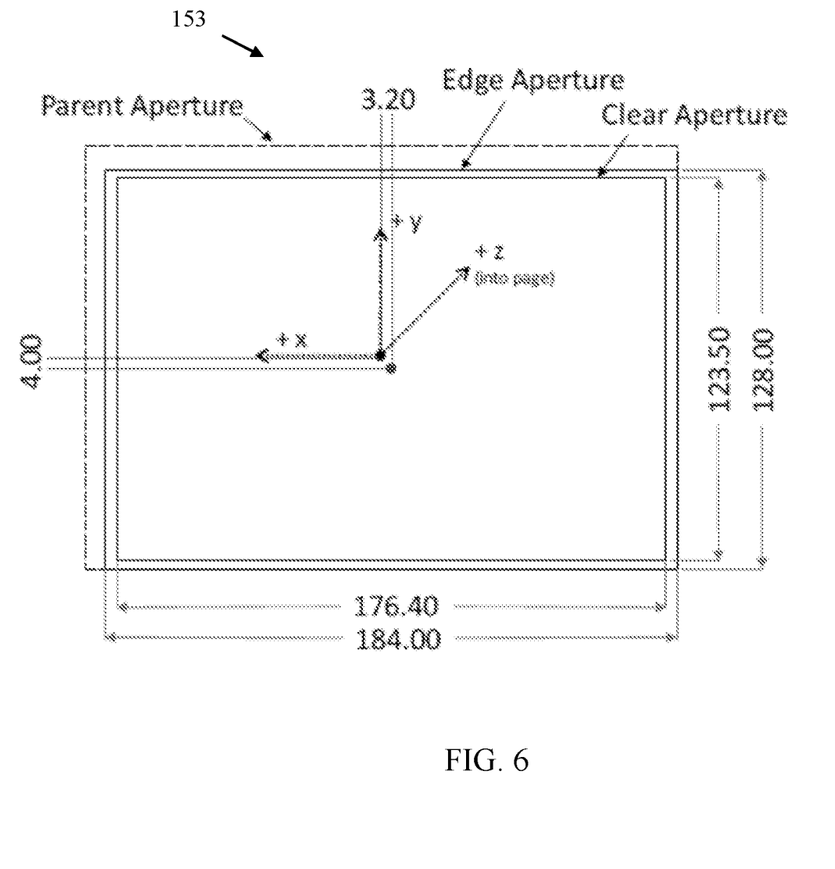
FIG. 6 is a perspective view looking at the reflective freeform surface of a tertiary mirror which may be employed in an embodiment of the disclosure.

As shown in FIG. 6, the tertiary mirror 153 may have, e.g., a rectangular edge aperture of 184×128 mm (X by Y), with a clear aperture of 176.4 mm×132.5 mm, and an aperture offset of 3.2 mm in the X axis and 4.0 mm in the Y axis.

In an echelle spectrometer, as noted previously, the fields-of-view are spectral fields-of-view where the spread of light varies per wavelength. Prior to dispersion (but after collimation) the light exists in a collimated beam. When the collimated beam interacts with the reflective echelle grating 120, it becomes dispersed in one dimension (e.g. X). The echelle grating 120 then becomes the aperture stop for the system, as all fields are coincident on the echelle grating 120. The echelle grating 120 is located prior to the freeform imager 150, and as such the primary 151, secondary 152, and tertiary 153 mirrors are all located away from the aperture stop and cannot be used to address field-constant aberrations without the addition of field-dependent aberrations. Any field-constant aberration generated by tilting the mirrors that requires correction will be balanced with the associated field-dependent aberrations, which increases the overall difficulty in obtaining excellent aberration correction.

A typical detector 160 may be a CMOS based sensor with a resolution of 2560×2048 comprised of 5 μm pixels, yielding an active area of 12.8×10.24 mm. The present system is advantageous in enabling use of such conventional sized area array detectors having active area height and width dimensions of less than 20 mm, more particular from 10 to 13 mm. The detector 160 may be housed within a sealed argon chamber that is cooled to increase the detector's quantum efficiency. An exemplary detector which may be used, e.g., is Anafocus Lince5M CMOS sensor coated with Lumogen to enhance UV detection. A calcium fluoride window 161 may be provided to provide an entrance port into the sealed chamber. The window 161 may be, e.g., 0.75 mm thick planar with a rectangular edge aperture of 17×18 mm (X by Y), with a clear aperture of 15 mm×16 mm.

In the illustrated embodiment of FIGS. 1A and 1B, the primary, secondary, and tertiary tilted mirrors 151, 152, 153 comprise an optical system with a nominal focal length of about 95 mm in Y and 79 mm in X with an F/# of about 2. The optical system is corrected over a diagonal full field of view of about 12 degrees, where, in the case of an echelle spectrometer, the spectral fields of view are generated by the two diffraction gratings. The aperture stop of the optical system comprised of the primary, secondary, and tertiary is located at the echelle grating.

In particular embodiments, the volume of a rectangular box surrounding all components of the echelle spectrometer may be, e.g., less than 12 liters, or less than 10 liters. In the illustrated embodiment of FIGS. 1A and 1B, the volume is approximately 9.5 liters and the light path is completely unobscured by bending the light into a fully 3D package. The object numerical aperture (NA) of the echelle spectrometer of FIGS. 1A and 1B is near 0.11, yielding an étendue of $7.3 \times 10^{-5}$ mm$^2$/sr. With the described detector, the spectral resolution of the echelle spectrometer is up to 2.3 picometers/pixel. The RMS spot size of the echelle spectrometer over the full slit is <3 μm.

The tables below provide the coefficients that describe the shapes of the mirrors found within the freeform imager 150 of a particular embodiment.

TABLE 1

Surface coefficients for the primary mirror 151

| Parameter | Coefficient |
| --- | --- |
| Mirror curvature (c) [mm$^{-1}$] | 0.005018 |
| Normalization radius of Zernike polynomials [mm] | 41.965439 |
| Conic constant (κ) | 2.740905 |
| C1 | −0.370585 |
| C2 | 0.000000 |
| C3 | −0.009355 |
| C4 | −0.370585 |
| C5 | 1.481964 |
| C6 | 0.000000 |
| C7 | 0.000000 |
| C8 | 0.084232 |
| C9 | 0.000000 |
| C10 | 0.000000 |
| C11 | 0.029226 |
| C12 | 0.031380 |
| C13 | 0.000000 |
| C14 | 0.000000 |
| C15 | 0.002559 |
| C16 | 0.000000 |
| C17 | 0.014106 |
| C18 | 0.000000 |
| C19 | 0.000000 |
| C20 | 0.001806 |
| C21 | 0.000782 |
| C22 | 0.000000 |
| C23 | 0.000000 |
| C24 | 0.000139 |
| C25 | 0.000000 |
| C26 | 0.000000 |
| C27 | 0.000848 |
| C28 | 0.000291 |

TABLE 2

Surface coefficients for the secondary mirror 152

| Parameter | Coefficient |
| --- | --- |
| Mirror curvature (c) [mm$^{-1}$] | −0.003313 |
| Normalization radius of Zernike polynomials [mm] | 117.998753 |
| Conic constant (κ) | 0.581157 |
| C1 | −0.071644 |
| C2 | 0.000000 |
| C3 | 0.080618 |
| C4 | −0.061081 |
| C5 | −3.494028 |
| C6 | 0.000000 |
| C7 | 0.000000 |
| C8 | −0.092042 |
| C9 | 0.010564 |
| C10 | 0.000000 |
| C11 | 0.091120 |
| C12 | −0.122277 |
| C13 | 0.000000 |
| C14 | 0.000000 |
| C15 | 0.001367 |
| C16 | 0.000000 |
| C17 | 0.011086 |
| C18 | 0.000000 |
| C19 | 0.000000 |
| C20 | 0.010013 |
| C21 | −0.002937 |
| C22 | 0.000000 |
| C23 | 0.000000 |
| C24 | 0.000563 |
| C25 | 0.000000 |
| C26 | 0.000000 |
| C27 | −0.000987 |
| C28 | 0.001563 |

TABLE 3

Surface coefficients for the tertiary mirror 153

| Parameter | Coefficient |
| --- | --- |
| Mirror curvature (c) [mm$^{-1}$] | −0.001155 |
| Normalization radius of Zernike polynomials [mm] | 95.287473 |
| Conic constant (κ) | −2.137946 |
| C1 | −0.012001 |
| C2 | 0.000000 |
| C3 | −0.449845 |
| C4 | 0.015580 |
| C5 | −0.703084 |
| C6 | 0.000000 |
| C7 | 0.000000 |
| C8 | −0.277190 |
| C9 | 0.027581 |
| C10 | 0.000000 |
| C11 | −0.205743 |
| C12 | 0.042053 |
| C13 | 0.000000 |
| C14 | 0.000000 |
| C15 | 0.003259 |
| C16 | 0.000000 |
| C17 | 0.028561 |
| C18 | 0.000000 |
| C19 | 0.000000 |
| C20 | 0.002295 |
| C21 | −0.003146 |
| C22 | 0.000000 |
| C23 | 0.000000 |
| C24 | 0.000175 |
| C25 | 0.000000 |
| C26 | 0.000000 |
| C27 | 0.002559 |
| C28 | 0.000286 |

The table below provides the vertex to vertex spacing between the components for a particular embodiment of the echelle spectrometer optical system 100

TABLE 4

Distances between components in the echelle spectrometer optical system 100

| Component A to Component B | Distance [mm] |
| --- | --- |
| Slit (101) to Collimator (110) | 175 |
| Collimator (110) to Echelle Grating (120) | 115 |
| Echelle Grating (120) to Dichroic Mirror (130) | 110 |
| Dichroic Mirror (130) to Cross-disperser (140) | 95 |
| Cross-disperser (140) to Primary Mirror (151) | 70 |
| Primary Mirror (151) to Secondary Mirror (152) | 152.51 |
| Secondary Mirror (152) to Tertiary Mirror (153) | 80 |
| Tertiary Mirror (153) to detector | 148.82 |

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An echelle spectrometer comprising:
a slit opening for incoming light;
a collimator which collimates a diverging beam of light generated through the slit;
a reflective echelle grating which disperses the collimated light along a first dimension;
a cross-disperser which disperses at least a portion of the collimated light in a second dimension orthogonal to the first dimension to create a two-dimensional spectral field-of-view; and
an imaging system which images the two-dimensional spectral field-of-view onto a detector;
wherein the imaging system comprises convex primary, concave secondary, and concave tertiary tilted mirrors, where each of the tilted mirrors comprises a freeform, rotationally non-symmetric surface shape.

2. The echelle spectrometer of claim 1, wherein the collimator comprises an off-axis section of a parabolic mirror which reflects the diverging beam of light generated through the slit to form collimated light to be incident upon the reflective echelle grating.

3. The echelle spectrometer of claim 1, wherein the reflective echelle grating comprises diffraction grating grooves having a blaze angle of about 66 degrees, and the reflective echelle grating is tilted at an angle near 0.5 degree from the blaze angle.

4. The echelle spectrometer of claim 1, further comprising a dichroic mirror wherein the dichroic mirror reflects an ultraviolet light portion of the collimated light reflected from the echelle grating to be incident upon the cross-disperser and transmits visible light.

5. The echelle spectrometer of claim 1, wherein the cross disperser comprises a reflective planar diffraction grating which creates outgoing diffracted light.

6. The echelle spectrometer of claim 5, wherein the cross disperser is tilted in both X and Y axis to unobscure the outgoing diffracted light.

7. The echelle spectrometer of claim 6, wherein the cross disperser has about 500 grooves per mm.

8. The echelle spectrometer of claim 1, wherein the detector comprises an area array detector having active area height and width dimensions of less than 20 mm.

9. The echelle spectrometer of claim 1, wherein the detector comprises an area array detector having active area height and width dimensions of from 10 to 13 mm.

10. The echelle spectrometer of claim 1, wherein the detector is a CMOS based sensor with a resolution of 2560×2048 comprised of 5 μm pixels, having an active area of 12.8×10.24 mm.

11. The echelle spectrometer of claim 1, wherein the primary, secondary, and tertiary tilted mirrors are optically coupled in a folded configuration fitting within a linear envelope having a maximum diameter that is less than six times a maximum entrance pupil diameter of the imaging system.

12. The echelle spectrometer of claim 11, wherein echelle spectrometer has a volume of less than 10 liters and a light path that is completely unobscured by bending the light into a fully 3D package.

13. The echelle spectrometer of claim 12, wherein an object numerical aperture (NA) of the echelle spectrometer is about 0.11.

14. The echelle spectrometer of claim 1, wherein the primary, secondary, and tertiary tilted mirrors comprise an optical system with a nominal focal length of about 95 mm in Y and 79 mm in X with an F/# of about 2.

15. The echelle spectrometer of claim 1, wherein an aperture stop of the imaging system comprised of the primary, secondary, and tertiary mirrors is located at the echelle grating.

16. The echelle spectrometer of claim 1, wherein each of the primary, secondary, and tertiary mirrors are freeform surfaces described by a base conic with a Zernike polynomial cap, following the equation:

$$z(x, y) = \frac{c\rho^2}{1 + \sqrt{1 - (1+\kappa)c^2\rho^2}} + \sum_{j=1}^{36} C_j Z_j,$$

(5)

where z is the sag of the surface, c is the curvature of the base conic, ρ is the radial coordinate, κ is the conic constant, $C_j$ is the coefficient of the $j^{th}$ Zernike term, $Z_j$.

\* \* \* \* \*